US008760838B2

(12) United States Patent
Hebert

(10) Patent No.: US 8,760,838 B2
(45) Date of Patent: *Jun. 24, 2014

(54) LIGHTNING PROTECTION SHEET WITH PATTERNED DISCRIMINATOR

(71) Applicant: 3M Innovative Properties Company, St. Paul, MN (US)

(72) Inventor: Larry S. Hebert, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,521

(22) Filed: May 6, 2013

(65) Prior Publication Data

US 2013/0242453 A1 Sep. 19, 2013

Related U.S. Application Data

(63) Continuation of application No. 12/761,212, filed on Apr. 15, 2010, now Pat. No. 8,503,153.

(60) Provisional application No. 61/170,360, filed on Apr. 17, 2009.

(51) Int. Cl.
*H05F 3/00* (2006.01)
*B60C 19/08* (2006.01)

(52) U.S. Cl.
USPC ............ 361/212; 361/216; 361/217; 361/218

(58) Field of Classification Search
USPC .......................................... 361/212, 216–218
See application file for complete search history.

(56) References Cited

U.S. PATENT DOCUMENTS

| 3,755,713 A | 8/1973 | Paszkowski |
| 3,989,984 A | 11/1976 | Amason et al. |
| 4,329,731 A | 5/1982 | Meulenberg, Jr. |
| 4,352,142 A | 9/1982 | Olson |
| 4,429,341 A | 1/1984 | King |
| 4,912,594 A | 3/1990 | Bannink, Jr. |
| 4,920,163 A | 4/1990 | Guillaumon et al. |
| 5,127,601 A | 7/1992 | Schroeder |
| 5,132,168 A | 7/1992 | Meyn et al. |
| 5,133,516 A | 7/1992 | Marentic et al. |
| 5,152,917 A | 10/1992 | Pieper et al. |
| 5,445,861 A | 8/1995 | Newton et al. |

(Continued)

FOREIGN PATENT DOCUMENTS

| DE | 408 331 | 1/1925 |
| DE | 10 2006 046 002 A1 | 4/2008 |

(Continued)

OTHER PUBLICATIONS

Buonocore et al.; *Ab initio* Calculations of Electron Affinity and Ionization Potential of Carbon Nanotubes, Nanotechnology, 19, Sep. 24, 2008, pp. 1-6.

(Continued)

*Primary Examiner* — Scott Bauer
(74) *Attorney, Agent, or Firm* — Philip Y. Dahl

(57) ABSTRACT

A lightning protection system is provided, typically for use on an outer surface of an aircraft, which includes the use of a lightning protection sheet that includes an electrically conductive film and at least one patterned, electrically non-conductive discriminator layer.

8 Claims, 2 Drawing Sheets

(56) References Cited

U.S. PATENT DOCUMENTS

| | | | |
|---|---|---|---|
| 6,986,853 B2 | 1/2006 | Glatkowski et al. | |
| 7,277,266 B1 | 10/2007 | Le et al. | |
| 7,396,477 B2 | 7/2008 | Hsiao | |
| 7,651,320 B2 | 1/2010 | Hansen | |
| 7,864,501 B2 | 1/2011 | Rawlings | |
| 7,869,181 B2 | 1/2011 | Le | |
| 2002/0192432 A1 | 12/2002 | Vermillion | |
| 2003/0152766 A1* | 8/2003 | Vargo et al. | 428/343 |
| 2004/0069895 A1 | 4/2004 | Pham et al. | |
| 2004/0126541 A1 | 7/2004 | Dietz | |
| 2004/0155150 A1 | 8/2004 | Krohmer | |
| 2006/0051592 A1 | 3/2006 | Rawlings et al. | |
| 2006/0143920 A1 | 7/2006 | Morrison et al. | |
| 2007/0093163 A1 | 4/2007 | Brown | |
| 2007/0141927 A1 | 6/2007 | Brown | |
| 2007/0201179 A1 | 8/2007 | Heeter | |
| 2007/0230085 A1 | 10/2007 | Le | |
| 2007/0236855 A1 | 10/2007 | Le et al. | |
| 2007/0258182 A1 | 11/2007 | Morrill et al. | |
| 2008/0075954 A1 | 3/2008 | Wardle | |
| 2008/0142238 A1 | 6/2008 | Rawlings | |
| 2008/0145555 A1 | 6/2008 | Kocik et al. | |
| 2008/0170349 A1 | 7/2008 | Stein | |
| 2009/0047471 A1 | 2/2009 | Kellenberger | |

FOREIGN PATENT DOCUMENTS

| | | | |
|---|---|---|---|
| DE | 10 2007 038926 B3 | | 2/2009 |
| EP | 0 163 805 | A1 | 1/1985 |
| EP | 0 227 122 | A2 | 7/1987 |
| EP | 0 629 549 | A2 | 12/1994 |
| EP | 0 900 647 | A2 | 3/1999 |
| EP | 1 011 182 | A1 | 6/2000 |
| EP | 1 767 344 | A2 | 3/2007 |
| EP | 1 935 631 | A2 | 6/2008 |
| EP | 1 935 784 | A2 | 6/2008 |
| EP | 1 944 236 | A2 | 7/2008 |
| FR | 2720214 | A1 | 11/1995 |
| RU | 2192991 | C2 | 11/2002 |
| RU | 2217320 | C1 | 11/2003 |
| RU | 2003/137750 | | 6/2005 |
| WO | WO 02/076430 | A1 | 10/2002 |
| WO | WO 2005/032812 | A2 | 4/2005 |
| WO | WO 2007/048426 | A1 | 5/2007 |
| WO | WO 2007/123700 | A1 | 11/2007 |
| WO | WO 2007/142354 | A1 | 12/2007 |
| WO | WO 2008/006377 | A1 | 1/2008 |
| WO | WO 2008/015082 | A1 | 2/2008 |
| WO | WO 2008/040936 | A1 | 4/2008 |
| WO | WO 2008/046186 | A1 | 4/2008 |
| WO | WO 2008/048705 | A2 | 4/2008 |
| WO | WO 2008/056123 | A1 | 5/2008 |
| WO | WO 2008/076851 | A1 | 6/2008 |

OTHER PUBLICATIONS

International Search Report, Form PCT/ISA/210; International Application No. PCT/US2010/031280, International filing Date: Apr. 15, 2010, (5 pages).

Lago. F., Gonzales J. J., Freton, P., Uhlig, F., Lucius, N, and Piau, G. P., "A Numerical Modeling of An Electric Arc and its Interaction with The Anode: Part III. Application To The Interaction of a Lightning Strike and an Aircraft in Flight", Journal of Physics D: Applied Physics. 39, 2006, pp. 2294-2310.

SAE Aerospace ARP5412 Revision A, Aircraft Lightning Environment and Related Test Waveforms, SAE International, Nov. 1, 1999.

Technical Report. IEC 6-1400-24, Wind Turbine Generator Systems—Part 24: Lightning Protection, International Electrotechnical Commission, $1^{st}$ edition, 2002-07.

* cited by examiner

LIGHTNING PROTECTION SHEET WITH PATTERNED DISCRIMINATOR

FIELD OF THE DISCLOSURE

This disclosure relates to a lightning protection sheet which includes at least one patterned, electrically non-conductive discriminator layer, typically for use on an outer surface of an aircraft.

BACKGROUND OF THE DISCLOSURE

The lightning strike of an aircraft in flight is not a rare phenomenon. It is estimated that strikes on civilian transport planes amount to about one strike per plane per year. The current trend in aeronautical engineering is to use lighter weight materials, fewer mechanical systems and more electronic systems. Electronic systems are often more sensitive than mechanical systems to electromagnetic disturbances such as those generated by lightning. Recently, electrically non-conductive or partially conductive fiber reinforced resin matrix materials are being used to fabricate more parts for airplanes, as well as for wind generators, automobiles, sporting goods, furniture, buses, trucks and other applications where stiff, light-weight materials, or consolidation of parts are beneficial. These lighter weight structures offer less effective protection against lightning than the traditional aluminum structures.

Conditions at the lightning attachment site are extreme. For aircraft lightning attachments, electrical current transients as high as 200,000 amperes are expected with charge transfers exceeding 200 coulombs. (SAE ARP5412 Revision A, Aircraft Lightning Environment and Related Test Waveforms, SAE International, Nov. 1, 1999.) Lightning attachments to wind generators vary greatly by geographic location and height, but electrical current transients as high as 100,000 amperes are expected with charge transfers as high as 300 coulomb. (Technical Report 61400-24, Wind Turbine Generator Systems—Part 24: Lightning Protection, International Electrotechnical Commission, $1^{st}$ edition 2002-07.) The temperature of the plasma in the lightning strike column has been estimated to be about 28,000° K. ("A numerical modeling of an electric arc and its interaction with the anode: part III. Application to the interaction of a lightning strike and an aircraft in flight," F Lago, J J Gonzalez, P Freton, F Uhlig, N Lucius and G P Piau 2006 J. Phys. D: Appl. Phys. 39 2294-2310.) Much of the damage caused by a lightning strike is the result from extreme levels of heat at the strike location caused by the elevated temperature within the lightning arc and ohmic heating of the materials.

Some investigators report the use of lightning protection systems which include conductive layers such as metalized woven fabric, metalized paper, solid metal films, foraminous metal films, metal wires, metal mesh, metal particles, expanded metal foils, carbon particles or carbon fibers. Some investigators report the use of lightning protection systems which include ionizable outer layers, such as paint layers. Strikes frequently destroy the protection mechanism at the attachment sites and cause measurable damage to modern light weight structures. This necessitates costly structural repair and related service interruption. The following references may be relevant to such technologies: WO 2005/032812 A1, US 2006/051592 A1, WO 2007/048426 A1, US 2008/142238 A1, US 2004/0069895, U.S. Pat. No. 4,920,163, EP 0227122 A, U.S. Pat. No. 7,277,266 B1, US 2007/0236855 A1, WO 2007/123700 A1, US 2007/0230085 A1, EP 1,935,784 A2, WO 2008/040936 A1, U.S. Pat. No. 4,352,142, WO2008/076851 A1, US 2007/0141927 A1, US 2008/0145555 A1, EP 1,944,236 A2, US 2008/0170349 A1, FR 2,720,214 A1, US 2007/0258182 A1, US 2007/0093163 A1, US 2007/0201179 A1, U.S. Pat. No. 5,127,601, U.S. Pat. No. 3,989,984, WO 2008/015082 A1, WO 2008/006377 A1, WO 2008/046186 A1, WO 2007/142354 A1, WO 2008/048705 A2, WO 2008/056123 A1, EP 1,935,631 A3, RU 2,263,581, RU 2,217,320 C1, WO 2002/076430 A, RU 2,192,991 C, EP 1,011,182 A1, EP 0,900,647 A, EP 629,549 A, DE 10 2006 046 002 B4, EP 163,805 A1, U.S. Pat. No. 5,132,168 A, U.S. Pat. No. 3,755,713 A and US 2006/0143920 A1.

SUMMARY OF THE DISCLOSURE

Briefly, the present disclosure provides a lightning protection sheet comprising an electrically conductive film having thickness t, which is typically between 0.01 and 10 microns, and an electrically non-conductive first discriminator layer having thickness $T_{DL}$ over the electrically conductive film, where the first discriminator layer is patterned into a plurality of features selected from the group consisting valley features having a depth d of between 50% and 100% of $T_{DL}$, ridge-and-trench features having a trench depth d of between 50% and 100% of $T_{DL}$, or combinations thereof. Some embodiments additionally comprising an electrically non-conductive second discriminator layer covering portions of the first discriminator layer, wherein the second discriminator layer comprises a second plurality of ridge-and-trench features which are non-parallel with the first plurality of ridge-and-trench features. In some embodiments, the electrically conductive film comprises a third plurality of ridge-and-trench features which are non-parallel with the first plurality of ridge-and-trench features. Some embodiments additionally comprise an electrically non-conductive second discriminator layer covering portions of the first discriminator layer, where the first discriminator layer has a first dielectric breakdown strength and the second discriminator layer has a second dielectric breakdown strength that is less than 90% of the first dielectric breakdown strength. The lightning protection sheet typically contains an amount of electrically conductive material weighing less than 50 g/m². The lightning protection sheet may additionally include one or more ionizable paint layers.

In another aspect, the present disclosure provides a lightning protection sheet comprising an electrically conductive film having thickness t, which is typically between 0.01 and 10 microns, and an electrically non-conductive first discriminator layer having thickness $T_{DL}$ over the electrically conductive film, where the first discriminator layer comprises a first material having a first dielectric breakdown strength and particles of a second material having a second dielectric breakdown strength that is less than 90% of the first dielectric breakdown strength, where the average diameter of the particles is between 50% and 100% of $T_{DL}$. The lightning protection sheet typically contains an amount of electrically conductive material weighing less than 50 g/m². The lightning protection sheet may additionally include one or more ionizable paint layers.

In another aspect, the present disclosure provides a composite aircraft structure bearing the lightning protection sheet according to the present disclosure.

This disclosure generally concerns a lightning protection "sheet" comprising various "layers" and/or "films," the lightning protection sheet providing protection to a "structure," typically a surface of an aircraft or spacecraft.

As used herein with regard to a film or layer, "substantially continuous" means not having a repeating pattern of holes or gaps that penetrate through the film or layer other than accidental or incidental holes or gaps such as for fasteners, passageways, and the like. With regard to a film or layer, "essentially continuous" means having no holes or gaps that penetrate through the film or layer other than accidental or incidental holes or gaps such as for fasteners, passageways, and the like.

As used herein with regard to a film, "thickness t" means average thickness measured orthogonal to the plane of film, regardless of any patterning of the film, and where appropriate may be taken to be the nominal thickness of a film used in the practice of the present disclosure before patterning.

As used herein with regard to a layer, "thickness $T_{DL}$" means an average of local maxima of thickness measured orthogonal to the plane of film.

As used herein, a "hill feature" in a film or layer means a local maximum in height surrounded by areas of lower height, height being measured orthogonal to the general plane of the sheet (i.e., regardless of bends or curves that follow bends or curves in the underlying surface), with positive height being in the direction away from the structure side of the sheet. Hill features may include, without limitation, cones, hemispheres, humps, pyramids of 3, 4 or more sides, or hard- or soft-edged frusta of any of the forgoing. As used herein, the height h of a hill feature means the difference in height between the local maximum and the adjacent local minima of height, averaged over 360 degrees. In some embodiments, hill features may also include, without limitation, dimpled frusta, e.g., "volcano" or bisected torus shapes, in which case the height h of the hill feature is measured at the rim of the hill feature.

As used herein, a "valley feature" in a film or layer means a local minimum in height surrounded by areas of greater height. Valley features may include, without limitation, inverted cones, inverted hemispheres, inverted humps, inverted pyramids of 3, 4 or more sides, or inverted hard- or soft-edged frusta of any of the forgoing. As used herein, the depth d of a valley feature means the difference in height between the local minimum and the adjacent local maxima of height, averaged over 360 degrees. In some embodiments, valley features may also include, without limitation, inverted dimpled frusta, in which case the depth d of the valley feature is measured at the deepest point(s) of the valley feature. In some embodiments, a valley feature may penetrate entirely through a film or layer.

As used herein, "ridge-and-trench features" in a film or layer comprise alternating ridges and trenches, which may be linear, curved or angled. In some embodiments, ridge-and-trench features may be branching. In some embodiments, ridge-and-trench features may form closed figures. As used herein, the height h of a ridge feature at a given point on a ridge means the difference in height between the local maximum and the average of the adjacent local minima of height along a line perpendicular to the ridge at that point. As used herein, the depth d of a trench feature at a given point on a trench means the difference in height between the local minimum and the average of the adjacent local maxima of height along a line perpendicular to the trench at that point. In some embodiments, a trench feature may penetrate entirely through a film or layer.

As used herein, "electrically conductive" means having a high electrical conductivity at room temperature, as least as high as is characteristic of metals in their metallic state, such as copper, aluminum, nickel, zinc, silver, gold, titanium, chromium, platinum, beryllium, magnesium, iron, and the like.

As used herein, "electrically non-conductive" means having a low electrical conductivity at room temperature, less than is characteristic of metals in their metallic state, typically including room-temperature semiconductors and insulators but in some embodiments including only room-temperature insulators and not semiconductors.

DETAILED DESCRIPTION

The present disclosure provides a lightning protection system including lightning protection sheet which includes an electrically conductive film and at least one patterned electrically non-conductive discriminator layer, typically for use on an outer surface of an aircraft. Typically, an aircraft using the lightning protection system of the present disclosure can bear a lightning strike without requiring repair that necessitates a service interruption. Typically, an aircraft using the lightning protection system of the present disclosure can bear a lightning strike without damage to the aircraft structure. In some embodiments, an aircraft using the lightning protection system of the present disclosure can bear a lightning strike without damage to the electrically conductive film of the lightning protection sheet.

Figure 1:
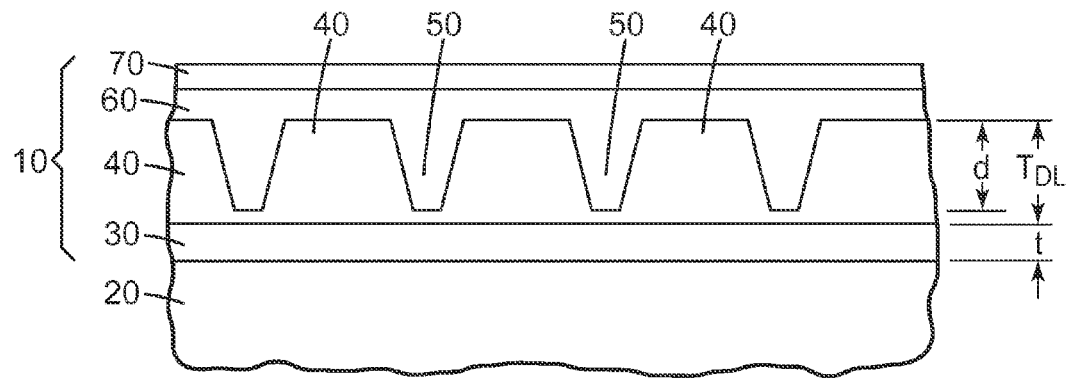
FIG. 1 is a schematic cross-section of a lightning protection system according to the present disclosure.

With reference to FIG. 1, a lightning protection system according to one embodiment of the present disclosure may comprise a lightning protection sheet 10 borne on a structure 20 which is typically a surface of an aircraft or spacecraft. Lightning protection sheet 10 includes electrically conductive film 30 having thickness t. Lightning protection sheet 10 additionally includes first discriminator layer 40 having thickness $T_{DL}$ above electrically conductive film 30, which is patterned with valley features 50 having depth d. Lightning protection sheet 10 may optionally include second discriminator layer 60 over first discriminator layer 40, which optionally fills valley features 50. Lightning protection sheet 10 may optionally include one or more additional surfacing layers 70, such as paint layers.

Figure 2:
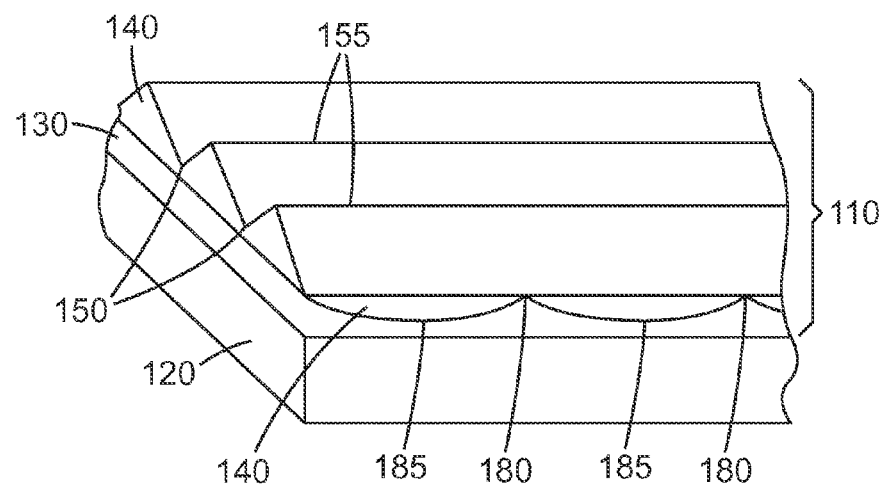
FIG. 2 is an orthogonal projection of a lightning protection system according to the present disclosure.

With reference to FIG. 2, a lightning protection system according to one embodiment of the present disclosure may comprise a lightning protection sheet 110 borne on a structure 120 which is typically a surface of an aircraft or spacecraft. Lightning protection sheet 110 includes electrically conductive layer 130 which is patterned with ridge-and-trench features including ridges 180 and trenches 185. In some embodiments, electrically conductive layer 130 comprises a thin film borne on a patterned support layer. Lightning protection sheet 110 additionally includes first discriminator layer 140 above electrically conductive layer 130, which is patterned with ridge-and-trench features including ridges 155 and trenches 150. Ridges 155 and trenches 150 of first discriminator layer 140 are typically non-parallel with ridges 180 and trenches 185 of conductive layer 130, and more typically perpendicular, as shown. Lightning protection sheet 110 may optionally include one or more second discriminator layers or additional surfacing layers, not shown.

Figure 3:
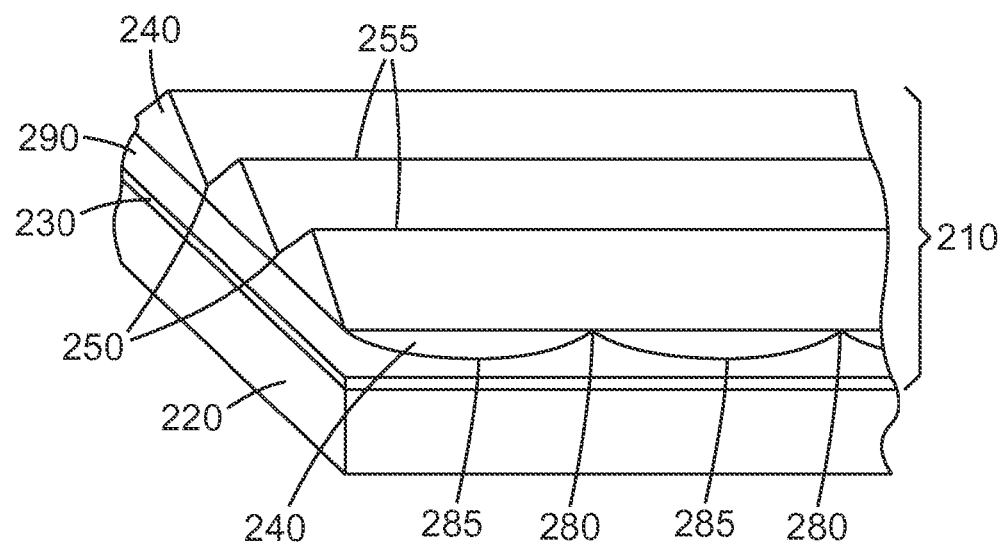
FIG. 3 is an orthogonal projection of a lightning protection system according to the present disclosure.

With reference to FIG. 3, a lightning protection system according to one embodiment of the present disclosure may comprise a lightning protection sheet 210 borne on a structure 220 which is typically a surface of an aircraft or spacecraft. Lightning protection sheet 210 includes electrically conductive film 230. Lightning protection sheet 210 additionally includes first discriminator layer 290 above electrically conductive film 230, which is patterned with ridge-and-trench features including ridges 280 and trenches 285. Lightning protection sheet 210 additionally includes second discriminator layer 240 above first discriminator layer 290, which is patterned with ridge-and-trench features including ridges 255 and trenches 250. Ridges 255 and trenches 250 of second discriminator layer 240 are typically non-parallel with ridges 280 and trenches 285 of first discriminator layer 290, and more typically perpendicular, as shown. Lightning protection sheet 210 may optionally include one or more additional surfacing layers, not shown.

The structure may be of any suitable material, typically a material used in aircraft or wind turbine construction, which may include, without limitation, metal, wood, polymer, carbon particles or fibers, glass particles or fibers, composites including one or more of the above, and the like.

Electrically conductive films or layers may be made of any suitable material. Typically the electrically conductive film comprises a metallic material. Typically the electrically conductive film comprises metal. Typically the electrically conductive film comprises a material having a favorable balance of properties including high electrical conductivity, low density and high resistance to corrosion. Useful metals may include, without limitation, copper, aluminum, nickel, zinc, silver, gold, titanium, chromium, platinum, beryllium, magnesium, iron, and the like, as well as metal alloys thereof. In some embodiments, the electrically conductive film is substantially continuous. In some embodiments, the electrically conductive film is essentially continuous. In some embodiments, the electrically conductive film is continuous. In some embodiments, the electrically conductive film is not continuous. In some embodiments, the electrically conductive film is not substantially continuous. In some embodiments, the electrically conductive film is an expanded foil. In some embodiments, the electrically conductive film is a mesh. In some embodiments, the electrically conductive film may be patterned as disclosed in U.S. Pat. App. 61/170,352, filed Apr. 17, 2009, the disclosure of which is incorporated herein by reference. In some embodiments, the electrically conductive film may be patterned with ridge-and-trench features.

The thickness t of the electrically conductive film 30 may be any suitable thickness. Lower thicknesses may yield lower weight. Thickness t is typically less than 1 mm, more typically less than 100 microns, more typically less than 50 microns and typically less than 10 microns. In some embodiments, thickness t is less than 5 microns. In some embodiments, thickness t is less than 2 microns. In some embodiments, thickness t is less than 1 micron. Thickness t is typically at least 0.001 micron, more typically at least 0.01 micron and more typically at least 0.1 micron.

The first discriminator layer may be made of any suitable material. Typically, the discriminator layer is made of an electrically non-conductive material, typically with a high dielectric breakdown strength, typically higher than air, more typically higher than 5 kV/mm, more typically higher than 10 kV/mm, and in some embodiments higher than 25 kV/mm. Useful materials may include, without limitation, ceramic, polymeric or textile materials or combinations thereof which may additionally contain particulate, fibrous or shaped fillers. Useful materials may additionally include, without limitation: epoxy, polyurethane, polyimide, polyester, polyethylene, polycarbonate, polyacrylate, fluoropolymer, silicone and may include additives or combinations of additives including barium titanate, lead titanate, strontium, titanate, barium stannate, barium strontium titanate, barium zirconate, cesium oxide, lanthanum oxide, titanium oxide, zinc oxide, carbon, silica or aramid. In some embodiments the first discriminator layer conforms to the upper side of the electrically conductive film, which may or may not be patterned.

The thickness $T_{DL}$ of the first discriminator layer may be any suitable thickness. Typically, $T_{DL}$ is between 1 micron and 1 cm, more typically between 10 micron and 1 mm, and more typically between 10 micron and 100 micron. In some embodiments, the first discriminator layer is patterned into a plurality of valley features having a depth d of between 50% and 100% of $T_{DL}$, in some embodiments between 75% and 100% of $T_{DL}$, and in some embodiments between 95% and 100% of $T_{DL}$. In some embodiments, the first discriminator layer is patterned into a plurality of ridge-and-trench features having a trench depth d of between 50% and 100% of $T_{DL}$, in some embodiments between 75% and 100% of $T_{DL}$, and in some embodiments between 95% and 100% of $T_{DL}$. In some embodiments, the first discriminator layer is patterned into a plurality of features which are a combination of the features addressed above. A depth of 100% of $T_{DL}$ means the feature penetrates the layer.

The pitch of the features, meaning average or typical distance between similar features may be any suitable pitch. The pitch of features is typically between 10 microns and 1 cm, more typically between 25 microns and 10 mm, and more typically between 20 microns and 1 mm.

The lightning protection system according to the present disclosure may optionally comprise one or more second discriminator layers. The second discriminator layer may be made of any suitable material. Typically, the second discriminator layer is made of an electrically non-conductive material, typically with a lower dielectric breakdown strength than discriminator layer, typically less than 90% of dielectric breakdown strength of discriminator layer, more typically less than 75% of dielectric breakdown strength of discriminator layer, and more typically less than 50% of dielectric breakdown strength of discriminator layer. In some embodiments, the second discriminator may be patterned in any of the ways discussed above for the first discriminator layer, with any patterning of the second discriminator layer chosen independently of any patterning of the first discriminator layer. The second discriminator may have an exterior surface which is generally planar or structured, e.g., in the form of uniform or non-uniform riblets or scales. Such patterned structures may be used to reduce frictional drag as taught, e.g., in U.S. Pat. No. 5,133,516, to reduce noise, or for other purposes. In some embodiments, the lower surface of the second discriminator layer follows the upper surface of the first discriminator layer. In some embodiments, a continuous second discriminator layer fills or partially fills concave features of the first discriminator layer. In some embodiments, a continuous second discriminator layer fills or partially fills concave features of the first discriminator layer.

In some embodiments, the patterning, if any, of the first discriminator layer, the second discriminator layer and the electrically conductive film cooperate to create a pattern of discrete potential attachment points. For example, in some embodiments, two or more of the first discriminator layer, second discriminator layer and electrically conductive film are patterned with ridge-and-trench features, where the ridges and trenches of one layer are non-parallel with and more typically perpendicular to the ridges and trenches of another layer.

The lightning protection system according to the present disclosure may optionally comprise one or more additional surfacing layers, such as paint layers. Additional surfacing layers may be made of any suitable material, including without limitation patterned or unpatterned paints. In one embodiment, the lightning protection system according to the present disclosure includes one or more additional surfacing layers which are ionizable paint layers. Such ionizable paint layers contain components which vaporize upon application of heat or electric current such as is present during a lightning strike and thereby provide an electrically conductive vapor above the lightning protection sheet in the area of the strike which may momentarily reduce the resistance to migration of the strike attachment point to other locations. Such components may include, without limitation, ionizable pigments such as titanium dioxide, zinc oxide, tin oxide, zinc orthotitanate, iron oxide, chromium oxide, cesium acid tartrate, barium oxalate, cesium salt, barium salt, or cesium tartrate. In some embodiments, additional surfacing layers are made of materials having a lower dielectric breakdown strength than discriminator layer, typically less than 90% of dielectric breakdown strength of discriminator layer, more typically less than 75% of dielectric breakdown strength of discriminator layer, and more typically less than 50% of dielectric breakdown strength of discriminator layer. Additional surfacing layers may have an exterior surface which is generally planar or structured, e.g., in the form of uniform or non-uniform riblets or scales. Such patterned structures may be used to reduce frictional drag as taught, e.g., in U.S. Pat. No. 5,133,516, to reduce noise, or for other purposes.

In some embodiments, the functions and characteristics of second discriminator layer and additional surfacing layer may be combined in a single layer. In some embodiments, second discriminator layer and additional surfacing layer must have different compositions.

The lightning protection system according to the present disclosure may optionally comprise a support layer which supports an electrically conductive film. In some embodiments, including embodiments where the electrically conductive film is patterned, the support layer may conforms to the underside of the electrically conductive film. In some embodiments the support layer fills only the underside of the patterned features of the electrically conductive film and does not extend below the electrically conductive film. Support layers may be made of any suitable material. Typically, support layers are made of electrically non-conductive materials, such as, without limitation, ceramic, polymeric or textile materials or combinations thereof which may additionally contain particulate, fibrous or shaped fillers. Useful materials may additionally include, without limitation: epoxy, polyurethane, polyimide, polyester, polyethylene, polycarbonate, polyacrylate, fluoropolymer, silicone and may include additives or combinations of additives including barium titanate, lead titanate, strontium, titanate, barium stannate, barium strontium titanate, barium zirconate, cesium oxide, lanthanum oxide, titanium oxide, zinc oxide, carbon, silica or aramid. In some embodiments support layers contains no adhesive. In some embodiments support layers contain no uncured polymer. In some embodiments support layers contains no pressure sensitive adhesive.

The lightning protection system according to the present disclosure may optionally comprise one or more additional non-conductive layers below the electrically conductive layer. Additional non-conductive layers may be useful to provide additional insulation against the transmission of electric current, heat, or both. Additional non-conductive layers may be useful where the underlying structure is electrically conductive. Additional non-conductive layers may be made of any suitable materials, including, without limitation, ceramic, polymeric or textile materials or combinations thereof which may additionally contain particulate, fibrous or shaped fillers. Useful materials may additionally include, without limitation: epoxy, polyurethane, polyimide, polyester, polyethylene, polycarbonate, polyacrylate, fluoropolymer, and may include additives or combinations of additives including barium titanate, lead titanate, strontium, titanate, barium stannate, barium strontium titanate, barium zirconate, cesium oxide, lanthanum oxide, titanium oxide, glass or aramid. In some embodiments additional non-conductive layer contains no adhesive. In some embodiments additional non-conductive layer contains no uncured polymer. In some embodiments additional non-conductive layer contains no pressure sensitive adhesive.

The lightning protection system according to the present disclosure may optionally comprise one or more adhesive layers. Adhesive layer may be made of any suitable adhesive materials, including, without limitation, pressure sensitive adhesives, hot melt adhesives, curable adhesives, and the like, which may include epoxy, polyurethane, polyester, polyethylene, polyacrylate, polycarbonate, polysulfide, or silicone adhesives. In some embodiments, the lightning protection system according to the present disclosure comprises no adhesive layer. In embodiments where the lightning protection sheet includes an adhesive layer, the sheet may be provided with a release liner to be removed from the adhesive layer prior to application of the sheet to the structure.

In some embodiments, the functions and characteristics of a support layer and an additional non-conductive layer may be combined in a single layer. In some embodiments, a support layer and an additional non-conductive layer must have different compositions. In some embodiments, the functions and characteristics of a support layer and an adhesive layer may be combined in a single layer. In some embodiments, a support layer and an adhesive layer must have different compositions. In some embodiments, the functions and characteristics of an additional non-conductive layer and an adhesive layer may be combined in a single layer. In some embodiments, an additional non-conductive layer and an adhesive layer must have different compositions. In some embodiments, the functions and characteristics of a support layer, an additional non-conductive layer and an adhesive layer may be combined in a single layer. In some embodiments, a support layer, an additional non-conductive layer and an adhesive layer must have different compositions.

In an alternate embodiment, first discriminator layer of the lightning protection sheet according to the present disclosure, having a thickness $T_{SL}$, comprises a first material having a first dielectric breakdown strength and particles of a second material having a second dielectric breakdown strength that is less than 90% of the first dielectric breakdown strength, more typically less than 75%, and more typically less than 50%, where the average diameter of the particles is between 50% and 100% of $T_{DL}$. Any of the materials discussed above for the first discriminator layer may be suitable for the first material. Any of the materials discussed above for the second discriminator layer may be suitable for the second material. Any additional layer discussed above may be added, including patterned or unpatterned conductive layers, additional surface layers, additional supporting layers, etc.

Typically, the lightning protection sheet of the present disclosure is lightweight. In some embodiments, the lightning protection sheet weighs less than 100 g/m$^2$, in some embodiments less than 50 g/m$^2$, in some embodiments less than 25 g/m$^2$, in some embodiments less than 15 g/m$^2$, and in some embodiments less than 10 g/m$^2$. The lightning protection sheet typically weighs at least 1 g/m$^2$. In some embodiments, the lightning protection sheet contains an amount of electrically conductive material weighing less than 50 g/m², in some embodiments less than 35 g/m², in some embodiments less than 20 g/m², in some embodiments less than 10 g/m², in some embodiments less than 4 g/m². The lightning protection sheet typically contains at least 0.5 g/m² of electrically conductive material. In some embodiments, the electrically conductive film patterned into a plurality of hill features which forms a component of the lightning protection sheet weighs less than 50 g/m², in some embodiments less than 35 g/m², in some embodiments less than 20 g/m², in some embodiments less than 10 g/m², in some embodiments less than 4 g/m². The electrically conductive film patterned into a plurality of hill features which forms a component of the lightning protection sheet typically weighs at least 0.5 g/m².

Without wishing to be bound by theory, the authors believe that the lightning protection system according to the present disclosure can function to prevent damage to aircraft structure and/or to itself during a lightning strike by encouraging multiplicity of attachment points and by encouraging rapid attachment point migration. In some embodiments, attachment points may preferentially occur at valley features. In some embodiments, attachment points may preferentially occur at the intersection of ridge or trench features of different layers. In some embodiments, the characteristics of specific heat, thermal conductivity, density, thickness or area, electrical conductivity and vaporization temperature of the electrically conductive film can combine such that, during lightning attachment to a lightning attachment point, the electrical conductance of the electrically conductive film at or surrounding the lightning attachment point drops rapidly (typically due to heating) until the conductance across the distance to another lightning attachment point becomes less through the conductor than it is through the adjacent discriminator(s), coating(s) or air. In some embodiments, the use of ionizable outer layers may enhance this effect by temporarily increasing conductivity in the air near an attachment point at the moment of a lightning strike. In some embodiments, this causes attachment point migration before the temperature of the electrically conductive film rises above its vaporization temperature. In some embodiments, this causes attachment point migration before the temperature of the material of the underlying aircraft structure rises above its vaporization temperature. In some embodiments, this causes attachment point migration before the temperature of the material of the underlying aircraft structure rises above its glass transition temperature. In some embodiments, this causes attachment point migration before the temperature of the material of the underlying aircraft structure rises above its damage threshold temperature.

The lightning protection system according to the present disclosure may be made by any suitable method. In some embodiments, a lightning protection sheet according to the present disclosure is made as an appliqué and attached to a pre-existing aircraft part. In some such embodiments, the lightning protection sheet may include an adhesive layer for attachment to the part. In some embodiments, a lightning protection sheet according to the present disclosure is incorporated into an aircraft part during manufacture of the part. In some embodiments, a lightning protection sheet according to the present disclosure is manufactured during manufacture of an aircraft part as integral to the part.

In some embodiments where a lightning protection sheet according to the present disclosure protects a composite part, the lightning protection sheet is laid up in a tool along with layers of prepreg or similar composite components prior to cure, so that the lightning protection sheet becomes integral to the part. Typically, the lightning protection sheet would be the first layer laid up in the tool or the last layer laid up in the tool so as to form the outermost layer of the part. In some such embodiments, the lower-most layer of the lightning protection sheet, farthest from the outer surface of the part, comprises an adhesive, which in some embodiments may be an uncured polymer, in some embodiments may be a partially cured polymer, or in some embodiments may be a curable polymer. In some such embodiments, the lower-most layer of the lightning protection sheet, farthest from the outer surface of the part, comprises no adhesive. In some such embodiments, the lower-most layer of the lightning protection sheet, farthest from the outer surface of the part, comprises no uncured polymer.

The discriminator layer(s) may by patterned by any suitable method. In some embodiments, pre-existing films may be patterned by any suitable method, such as stamping, embossing, calendaring, molding, machining or the like. The films so patterned may then be combined with other layers by any suitable means, which may include introducing layers of solid material, layers of malleable material, liquids, solutions or suspensions of materials, or the like, by lamination, coating, spray application, printing methods, or the like. In some embodiments, adjacent layers may impart a pattern to one or both surfaces of another layer. Layers may be combined by any suitable method, such as by lamination, coating, spray application, printing methods, use of adhesives, in situ cure, or the like.

The lightning protection system of the present disclosure may be used to make parts for air vehicles, space vehicles, wind generators, automobiles, buses, trucks, or any other application where lightning protection, electromagnetic interference shielding or static charge management are required on otherwise electrically non-conductive or partially conductive materials. The lightning protection system of the present disclosure may also be applied to electrically conductive parts for air vehicles, space vehicles, wind generators, automobiles, buses, trucks, or any other application where improved lightning protection, electromagnetic interference shielding or static charge management are desired.

Various modifications and alterations of this disclosure will become apparent to those skilled in the art without departing from the scope and principles of this disclosure, and it should be understood that this disclosure is not to be unduly limited to the illustrative embodiments set forth hereinabove.

I claim:

1. A lightning protection sheet comprising an electrically conductive film having thickness t and an electrically non-conductive first discriminator layer having thickness $T_{DL}$ over the electrically conductive film, where the first discriminator layer is patterned into a plurality of valley features having a depth d of between 50% and 100% of $T_{DL}$, additionally comprising an electrically non-conductive second discriminator layer covering portions of the first discriminator layer, where the first discriminator layer has a first dielectric breakdown strength and the second discriminator layer has a second dielectric breakdown strength that is less than 90% of the first dielectric breakdown strength.

2. The lightning protection sheet according to claim 1 wherein the electrically non-conductive first discriminator layer comprises ionizable pigments.

3. The lightning protection sheet according to claim 1 wherein t is between 0.001 and 100 microns.

4. The lightning protection sheet according to claim 1 wherein t is between 0.01 and 10 microns.

5. The lightning protection sheet according to claim 1 wherein d is between 6 microns and 1 mm.

6. The lightning protection sheet according to claim 1 which contains an amount of electrically conductive material weighing less than 50 g/m$^2$.

7. The lightning protection sheet according to claim 1 additionally comprising a layer of ionizing paint.

8. A composite aircraft structure bearing the lightning protection sheet according to claim 1.

* * * * *

UNITED STATES PATENT AND TRADEMARK OFFICE
CERTIFICATE OF CORRECTION

Page 1 of 1

PATENT NO. : 8,760,838 B2
APPLICATION NO. : 13/887521
DATED : June 24, 2014
INVENTOR(S) : Larry Hebert It is certified that error appears in the above-identified patent and that said Letters Patent is hereby corrected as shown below:

In the Specification:

Column 5
Line 41, delete "61/170,352," and insert -- 61/170,352 (Atty. Docket No. 65148US002), --, therefor.

Column 8
Line 48, delete "$T_{SL}$," and insert -- $T_{DL}$, --, therefor.

Column 10
Line 15, delete "may by" and insert -- may be --, therefor.

Signed and Sealed this
Twenty-fourth Day of February, 2015

Michelle K. Lee
*Deputy Director of the United States Patent and Trademark Office*